Figure 1:
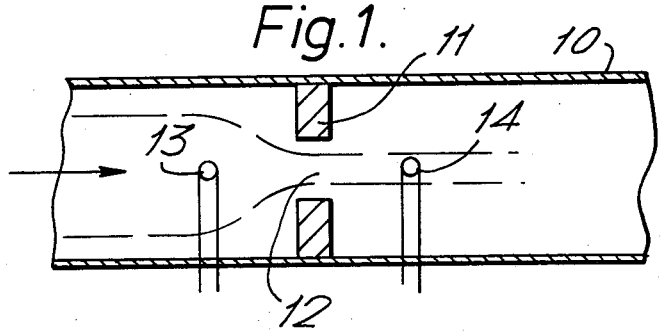

United States Patent [19]

Agar et al.

[11] 4,083,244

[45] Apr. 11, 1978

[54] METHOD AND APPARATUS FOR MEASURING FLUID FLOW AND/OR FOR EXERCISING A CONTROL IN DEPENDENCE THEREON

[75] Inventors: Joram Agar, Alresford; Klaus Joachim Zanker, Four Marks, both of England

[73] Assignee: Agar Instrumentation Incorporated, Houston, Tex.

[21] Appl. No.: 743,029

[22] Filed: Nov. 18, 1976

[30] Foreign Application Priority Data

Nov. 24, 1975 United Kingdom .............. 48186/75

[51] Int. Cl.$^2$ ............................................. G01F 1/68
[52] U.S. Cl. ............................................. 73/204
[58] Field of Search ............................................. 73/204

[56] References Cited

U.S. PATENT DOCUMENTS

| | | | |
|---|---|---|---|
| 1,156,630 | 10/1915 | Savage | 73/204 |
| 2,412,471 | 12/1946 | Olson | 73/204 |
| 2,431,241 | 11/1947 | Godsey, Jr. | 73/204 |
| 2,458,331 | 1/1949 | Borell | 73/204 |
| 3,147,618 | 9/1964 | Benson | 73/204 |
| 3,559,482 | 2/1971 | Baker et al. | 73/204 |
| 3,677,085 | 7/1972 | Hayakawa | 73/204 |
| 3,777,563 | 12/1973 | Yamasaki et al. | 73/204 |
| 3,915,000 | 10/1975 | Tertilt | 73/204 |

FOREIGN PATENT DOCUMENTS

| | | | |
|---|---|---|---|
| 320,812 | 5/1920 | Germany | 73/204 |
| 1,245,138 | 9/1971 | United Kingdom | 73/204 |

*Primary Examiner*—Herbert Goldstein
*Attorney, Agent, or Firm*—Beveridge, De Grandi, Kline & Lunsford

[57] ABSTRACT

Apparatus for determining fluid flow, said apparatus comprising flow obstruction means and two heat-emitting members which are mounted in a geometrically symmetrical arrangement in a conduit, the heat-emitting members being subject to the same heat losses when there is no fluid flow through the conduit, the flow obstruction means causing the two heat-emitting members to be differentially affected by the fluid flow through the conduit, and means responsive to the ratio of the heat losses from the two heat-emitting members for determining the said fluid flow.

14 Claims, 12 Drawing Figures

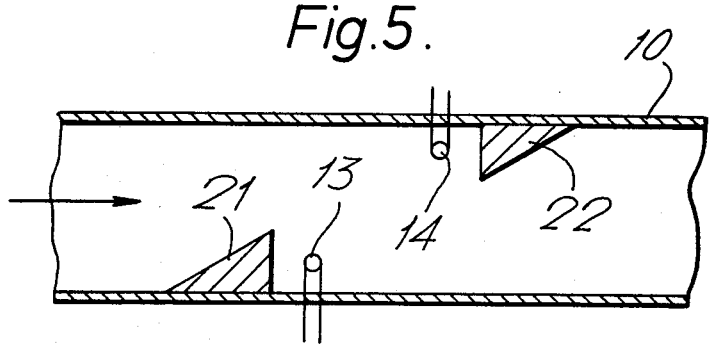
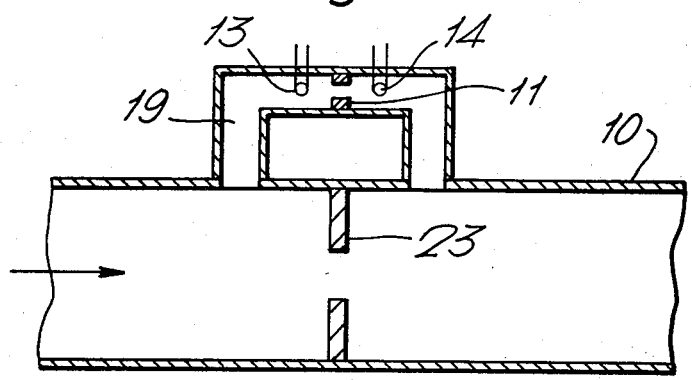
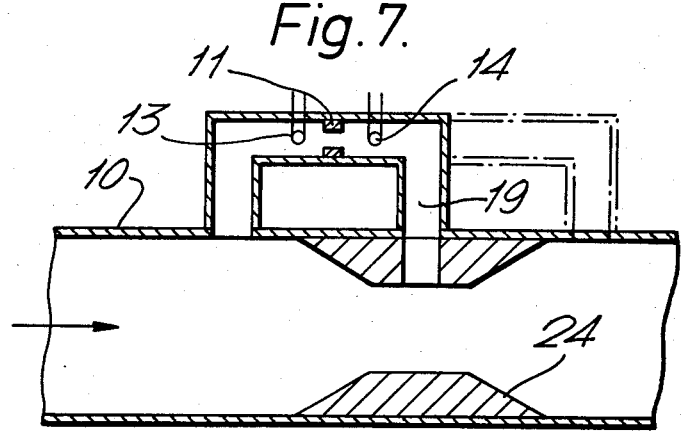

METHOD AND APPARATUS FOR MEASURING FLUID FLOW AND/OR FOR EXERCISING A CONTROL IN DEPENDENCE THEREON

This invention concerns apparatus for determining fluid flow and/or for exercising a control in dependence thereon.

It is known to measure the flow of a fluid by determining the heat loss from a hot body caused by forced convection effected by the flow to be measured. In this case, the heat loss is $$Q_F = K.\Delta T \, \phi \, (Re).$$

where
K = the conductivity of the fluid
$\Delta T$ = the temperature differential between the hot body and the fluid,
$\phi(Re)$ = a function of the Reynolds number of the hot body $$Re = \frac{Vd\rho}{\mu} = \frac{M}{d\mu},$$

v = the flow velocity of the fluid,
$\rho$ = the density of the fluid,
$\mu$ = the viscosity of the fluid,
d = the size of the hot body,
M = the mass flow of the fluid.

As will be seen from the formula given above, the heat loss depends upon the temperature differential $\Delta T$ and upon various properties of the fluid being measured, i.e. the fluid conductivity K, the fluid density $\rho$ and the fluid viscosity $\mu$. Consequently, the mass flow, if deduced from the heat loss, also depends upon these factors.

At low to zero flow rates, moreover, the heat loss from the hot body is no longer by forced convection but is by natural convection. In that case, the heat loss $Q_N = K.\Delta T \, \phi \, (G)$ where
$\phi(G)$ = a function of the Grashof number of the body, $$G = g \frac{\Delta T}{T} d^3 \frac{\rho^2}{\mu^2},$$

g = acceleration due to gravity,
T = the absolute temperature of the hot body.

Thus in this case the zero no longer depends upon the flow but upon fluid properties. In order to compensate for this zero shift problem, therefore, it is known to limit the use of a flow meter which measures such heat loss to one single fluid, typically air, and to compensate appropriately for temperature.

It is, however, known to employ two hot bodies, one of which is a reference hot body disposed in a cavity communicating with a main flow conduit in which the other hot body is disposed. However, although such an arrangement is satisfactory at low flows, it gives an erroneous reading at high flows because the reference hot body is subject only to natural convection, and the arrangement also introduces undesirable density and hence pressure effects in gas mass flow metering.

The arrangement also may in certain circumstances, have undesirable thermal equilibrium properties.

Previously known flow meters, moreover, have been insensitive to the flow direction. Such insensitivity, however, is undesirable in certain circumstances, e.g. if it is desired to detect a reverse flow, or if it is desired to measure a pulsating flow having a zero mean, such as can arise, for example, from the wind blowing past a chimney. A hot body such as a simple hot wire anemometer would, under these circumstances, act as a rectifier and indicate an erroneous flow.

According to the present invention there is provided apparatus for determining fluid flow and/or exercising a control in dependence thereon, said apparatus comprising flow obstruction means and two heat-emitting members which are mounted in a geometrically symmetrical arrangement in a conduit so that the heat-emitting members are subject to the same heat loss when there is no fluid flow through the conduit, the flow obstruction means causing the two heat-emitting members to be differently affected by the fluid flow through the conduit, and means responsive to the ratio of the heat losses from the two heat-emitting members for determining the said fluid flow and/or for exercising a control in dependence thereon.

In the case of the present invention, the fluid flow is determined, and/or the control is exercised, in dependence upon the ratio of the heat losses from the two heat-emitting members, and consequently the zero shift problem which is referred to above is eliminated since both of the heat-emitting members are equally affected by natural convection. Moreover, since both the heat-emitting members are subject to the fluid flow and operate under the same mode of heat loss by forced convection, compensation is better than is given by the use of a reference hot body in a cavity operating under natural convection.

Furthermore, since the two heat-emitting members are differentially affected by the fluid flow through the conduit, the apparatus of the present invention is sensitive to the flow direction.

The conduit may, if desired, be a by-pass conduit which is arranged to receive part of the flow passing through a duct.

Alternatively, the conduit may be provided in a probe which is adapted to be inserted into a duct.

The flow obstruction means may comprise a flow obstruction member on opposite sides of which the heat-emitting members are disposed In this case the heat-emitting members may be disposed on opposite sides of and are aligned with an orifice in a flow obstruction member which extends completely across the conduit.

Alternatively, the heat-emitting members may be disposed on opposite sides of a flow obstruction member which extends partially across the conduit.

A further possibility is that the heat-emitting members are located at opposite ends of a venturi-shaped flow obstruction means.

Yet another possibility is that the flow obstruction means comprises two flow obstruction members which are spaced apart along the axis of the conduit, the heat-emitting members being disposed between the two flow obstruction members.

Means are preferably provided for heating the heat-emitting members.

The heat-emitting members may be thermistors, hot wire anomometers or thermocouples.

The invention also comprises a method of determining the fluid flow through a conduit and/or for exercising a control in dependence thereon, said method comprising mounting flow obstruction means and two heat-emitting members in a geometrically symmetrical arrangement in the conduit so that the heat-emitting members are subject to the same heat losses when there is no fluid flow through the conduit, producing a fluid flow through the conduit which causes the two heat-emitting members to be differentially affected by the said fluid flow, and employing the ratio of the heat-losses from the two heat-emitting members to determine the said fluid flow and/or to exercise the said control.

The said ratio may be employed to determine the direction of flow of the fluid through the conduit.

Figure 8:
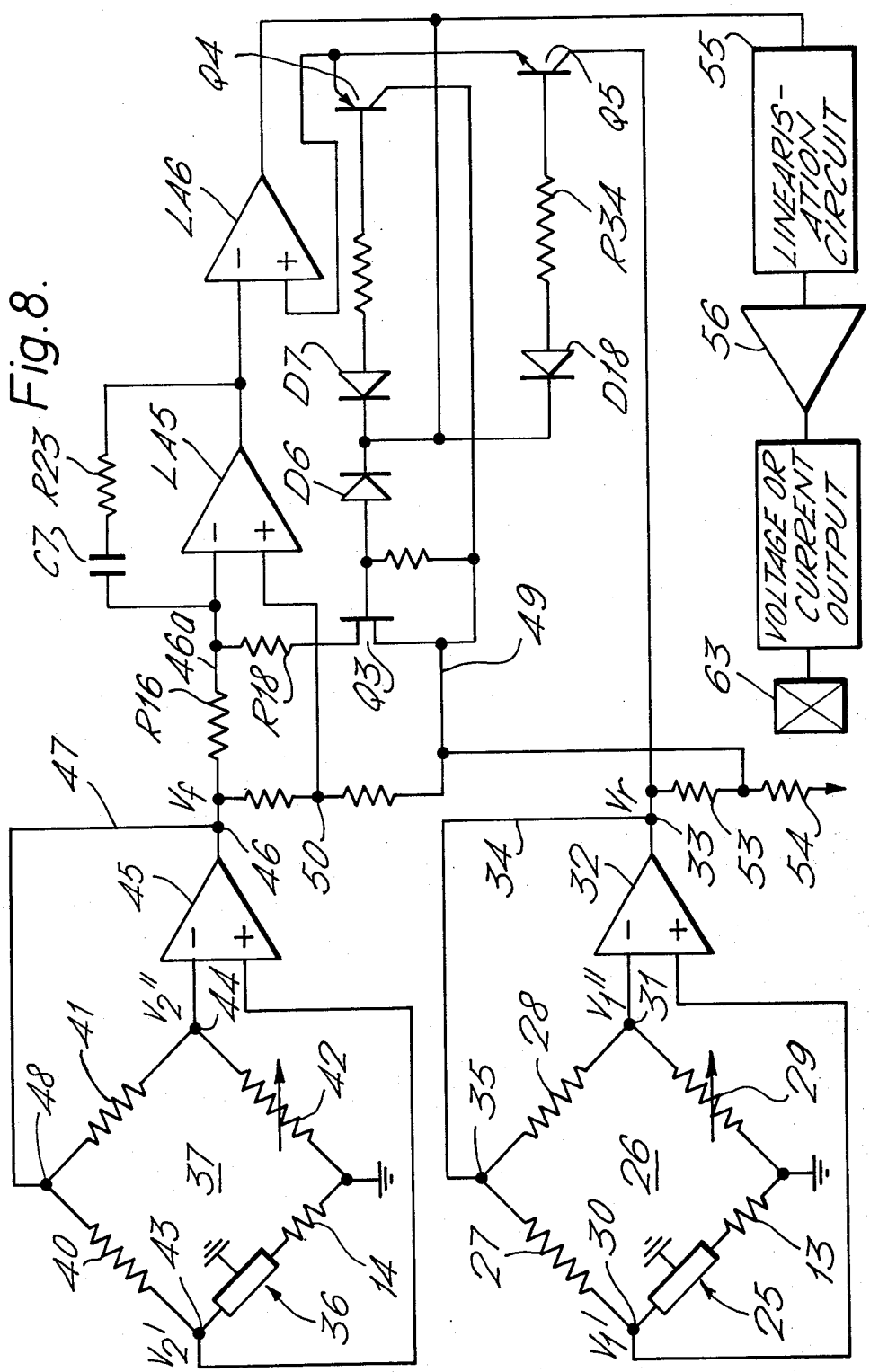
Figure 9:
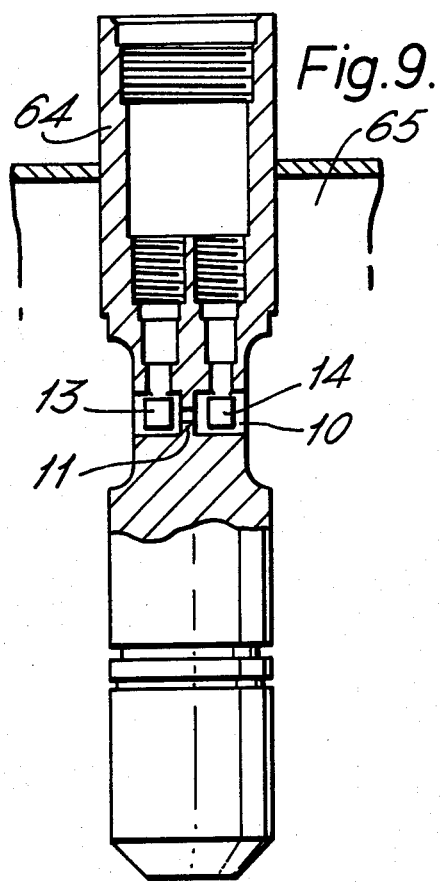
Figure 11:
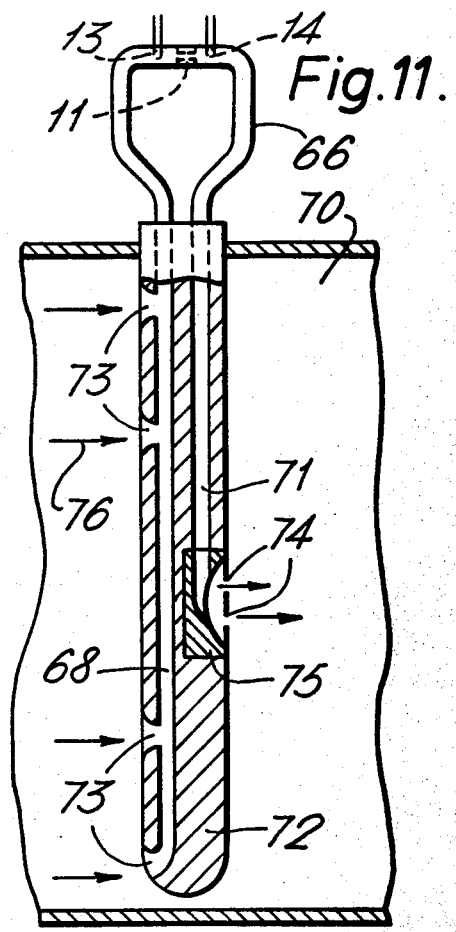
Figure 10:
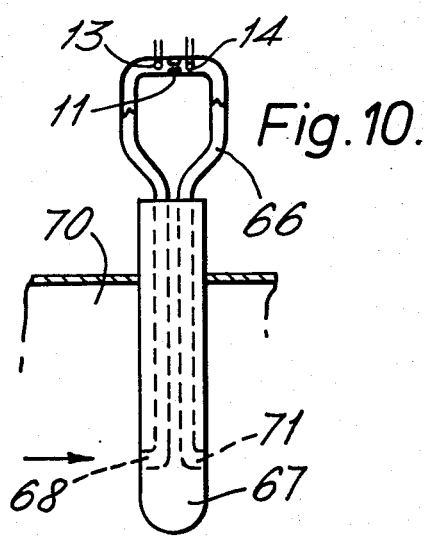
Figure 12:
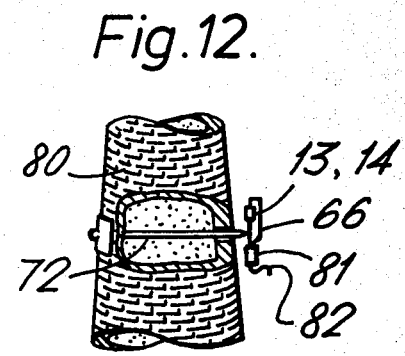

The invention is illustrated, merely by way of example, in the accompanying drawings, in which:

FIGS. 1 to 5 are broken-away diagrammatic views of a number of different embodiments of apparatus according to the present invention, FIGS. 6 and 7 are broken-away diagrammatic views of further embodiments of apparatus according to the present invention each of which incorporates a by-pass, FIG. 8 is a circuit diagram, FIG. 9 is a diagrammatic view of a probe incorporating apparatus according to the present invention and inserted into a duct, FIGS. 10 and 11 are diagrammatic views of two different probes each having a by-pass conduit in which the apparatus of the present invention is provided, and FIG. 12 is a diagrammatic broken away perspective view of a flue stack provided with apparatus according to the present invention.

In FIG. 1 there is shown a conduit 10 within which is mounted a flow obstruction member or orifice plate 11 which extends transversely of and completely across the conduit 10, the orifice plate 11 having a centrally disposed orifice 12 therein. Mounted within the conduit 10 on opposite sides of the orifice plate 11 are thermistors, or other heat-emitting members 13, 14 which are equally spaced from the orifice plate 11, and which are aligned with the orifice 12 therein.

The orifice plate 11 and the thermistors 13, 14 are thus disposed in a geometrically symmetrical arrangement having a plane of symmetry extending transversely of the conduit 10 and centrally through the orifice plate 11, such a symmetrical arrangement ensuring that the thermistors 13, 14 have the same heat losses at zero flow therepast. However, the thermistors 13, 14 are, so to speak, assymmetrical with respect to the fluid flow through the conduit 10, since the thermistor 13 is subjected to a fluid flow which is substantially unaffected by the existence of the orifice plate 11, while the thermistor 14 is subjected to the jet issuing through the orifice 12. The orifice plate 11 thus causes the thermistors 13, 14 which are heated by means not shown, to be differentially affected by the fluid flow through the conduit 10, so as to have different heat losses.

As described below with reference to the circuit of FIG. 8, the ratio of the outputs from the thermistors 13, 14 is used to produce an indication of the flow rate. This use of the said ratio ensures that there is no change in the indication of the flow rate irrespective of the temperature difference between the thermistors 13, 14 and the fluid passing through the conduit 10 and irrespective of the thermal conductivity of said fluid. The use of the said ratio, together with appropriate design of the thermistors 13, 14, also eliminates any effect on the said indication by the density or pressure of the fluid.

Thus, if in contrast to the present invention, one were to use the difference between the outputs of the thermistors 13, 14, as opposed to their ratio, this would only give temperature and conductivity compensation at zero flow. At higher flow rates, this method of compensation would not work satisfactorily, since the output is proportional to three parameters, namely mass flow rate, the temperature difference between the thermistor 13 and the fluid passing through the conduit 10, and the conductivity of the fluid.

For example $V_{13} \alpha KM\Delta T.$
$V_{14} \alpha KG\Delta T.$ where $V_{13}$ and $V_{14}$ are the voltages across the thermistors 13, 14 respectively, $\Delta T$ = the temperature difference between the thermistors 13, 14 and the gas $M$ = the mass flow rate in kg/m³, $G$ = the Grashof Number, $K$ = the thermal conductivity of the gas.

If the temperature changes from $\Delta T_1$ to $\Delta T_2$, in the case of $\Delta T_1$, $$\Delta V_1 = V_{13} - V_{14} = KM\Delta T_1 - KG\Delta T_1 = \Delta T_1 K (M-G);$$

in the case of $\Delta T_2$, $$\Delta V_2 = V_{13} - V_{14} = \Delta T_2 K (M-G).$$

In this case the difference $\Delta V_2 - \Delta V_1$ is clearly $(\Delta T_2 - \Delta T_1) K (M-G)$.

If, however, the ratio of the voltages is used in accordance with the present invention, the output will not vary with the gas temperature even at full flow Thus in the case of $\Delta T_1$, $$\frac{V_{13}}{V_{14}} = \frac{\Delta T_1 MK}{\Delta T_1 GK} = \frac{M}{G}.$$

In the case of $\Delta T_2$, $$\frac{V_{13}}{V_{14}} = \frac{\Delta T_2 MK}{\Delta T_2 GK} = \frac{M}{G}.$$

Thus as stated above, in the case of the present invention, there is no change in output irrespective of the differential temperature between the thermistors 13, 14 and the gas, and irrespective of the thermal conductivity of the gas, as can be shown by keeping $\Delta T$ constant and varying $K_1$ to $K_2$.

The arrangement shown in FIG. 1 provides a high output because of the jet effect, and enables one to tune the apparatus by varying the size of the pipe, the size or shape of the jet, and the size or spacing of the thermistors 13, 14. It is, moreover, simple to manufacture, and, when used in a by-pass as shown in any of FIGS. 6, 7, 10 and 11, determines the by-pass flow.

The arrangements shown in FIGS. 2 to 5 are generally similar to that of FIG. 1, and will not therefore be described in detail, like reference numerals indicating like parts.

Figure 2:
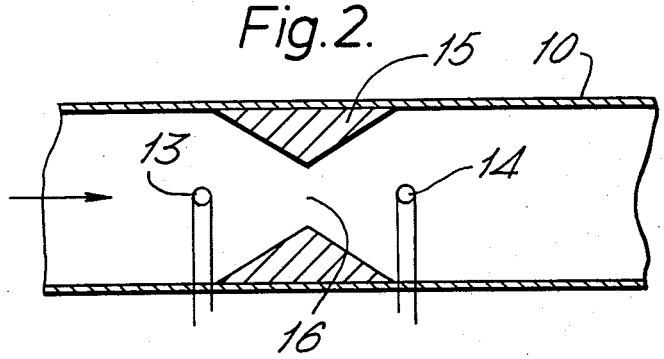

In the cae of the FIG. 2 construction, however, the orifice plate 11 is replaced by a venturi-shaped flow obstruction member 15 having a throat 16, the thermistors 13, 14 being located at opposite ends of the obstruction member 15. As will be appreciated, in the FIG. 2 construction, the thermistor 13 is disposed upstream of the throat 16, while the thermistor 14 is disposed downstream thereof and in the jet issuing from the throat 16.

Figure 3:
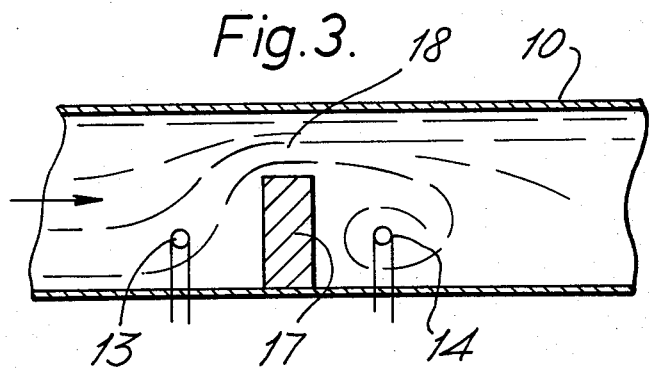

In the FIG. 3 construction, the orifice plate 11 of FIG. 1 is replaced by a flow obstruction member 17 which is rectangular in cross section and which extends only partially across the conduit 10, so as to leave a space 18 through which the fluid can flow. However, in this arrangement, the thermistor 13 is disposed in the full flow of the fluid through the conduit 10, whereas the thermistor 14 is disposed in the wake of the obstruction member 17.

Figure 4:
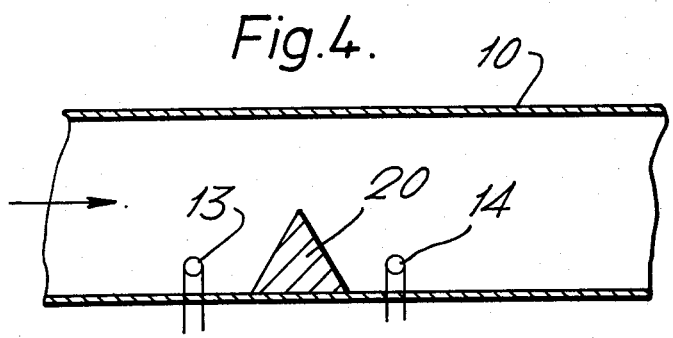

The FIG. 4 construction is generally similar to that of FIG. 3 except that, instead of providing a flow of obstruction member 17 which is rectangular in cross-section, a flow obstruction member 20 is provided which is triangular in cross-section.

In the FIG. 5 construction, use is made of two flow obstruction members 21, 22 which are spaced apart axially of the conduit 10 and each of which is substantially triangular in cross-section. In this case, the thermistors 13, 14 are disposed between the flow obstruction members 21, 22. Thus the thermistor 13 is disposed in the wake of the flow obstruction member 21, while the thermistor 14 is disposed immediately upstream of the flow obstruction member 22.

If the FIG. 1 or the FIG. 3 construction is employed for measuring a dirty flow of gas, it may be necessary to provide for filtration so as to ensure that the orifice 12 or space 18 does not become blocked. If such filtration is not for some reason practicable, or if it is wished to avoid the need to provide it, a construction as shown in any of FIGS. 2, 4 and 5 can be employed, since the shapes of the flow obstructions therein are such as to be much less subject to blockage by dirt.

The FIG. 6 construction is generally similar to that of FIG. 1 except that the orifice plate 11 and thermistors 13, 14 are arranged in a by-pass 19 which extends between opposite sides of an orifice plate 23; or other differential pressure device, in the conduit 10.

The FIG. 7 construction is similar to that of FIG. 6 except that the upstream end of the by-pass 19 is disposed immediately upstream of a venturi portion 24 while the downstream end of the by-pass 19 communicates with the throat of the venturi portion 24.

As will be appreciated, since in each of the arrangements of FIGS. 1 to 6, the flow obstruction member or members causes the two thermistors 13, 14 to be differentially affected by the fluid flow through the conduit 10, or by-pass 19, the apparatus will be sensitive to the flow direction. For example, in the case of the FIG. 1 construction, if the flow is in the direction opposite to that indicated by the arrow, the thermistor 14 will be subjected to a fluid flow which is substantially unaffected by the existence of the orifice plate 11, while the thermistor 13 will be subjected to the jet which will issue through the orifice 12.

The FIG. 7 construction, as shown, is intended for use only for a fluid flowing in the direction of the arrow therein. However, if the by-pass 19, instead of communicating with the throat of the venturi portion 24, is arranged (as indicated by dotted lines in FIG. 7) so that the opposite ends of the by-pass 19 are disposed symmetrically of the venturi portion 24, then the FIG. 7 construction can be used to measure flow in either direction.

As shown in FIG. 8, the thermistor 13, together with a Zener diode 25 constituting a safety barrier, is connected in one arm of an electrical bridge 26. The remaining arms of the bridge 26 have fixed resistances 27, 28, and a variable resistance 29. When the bridge 26 is balanced, as a result of the thermistor 13 operating at a predetermined temperature, the voltages $V_1'$ and $V_1''$ at points 30, 31 on the bridge 26 will be the same. The points 30, 31 are respectively connected to positive and negative terminals of a difference amplifier 32 the input to which is not shown. The output from the difference amplitude 32 is taken to a point 33 on a lead 34, the latter being connected to a point 35 on the bridge 26. Accordingly, if the resistance of the thermistor 13 increases or decreases as a result of its temperature being reduced or increased, the output voltage at the points 33, 35 will be reduced or increased respectively in such a way as, in practice, to maintain the temperature of the thermistor 13 substantially constant. Thus an alteration in the heat dissipation of the thermistor 13 produced by a change in the flow rate or by a change in the temperature or composition of the fluid will produce a change in the voltage at the points 33, 35.

Similarly, the thermistor 14, together with a Zener diode safety barrier 36, is connected in one arm of an electrical bridge 37. The other arms of the bridge 37 respectively contain fixed resistances 40, 41 and a variable resistance 42. When the bridge 37 is balanced, as a result of the thermistor 14 being operated at a predetermined temperature, the voltages $V_2'$ and $V_2''$ at points 43, 44 respectively on the bridge 47 are the same. The points 43, 44 are connected respectively to positive and negative terminals of a difference amplifier 45 the input to which is not shown and the output from which is connected at a point 46 to a lead 47, the latter being connected to a point 48 on the bridge 37.

Accordingly, as in the case of the bridge 26, the thermistor 14 is kept at a constant temperature, any change in the heat dissipation of the thermistor 14 produced by variation in the temperature or composition of the gases flowing through the conduit 10 resulting in a change in voltage at the points 46, 48.

The point 46 is connected to a transistor Q4 by a lead 49, a point 50 on which is connected to an integrator LA5 across which there is connected a circuit comprising a condenser C7 and resistance R23. The point 46 is connected to the integrator LA5 by a lead 46a containing a resistance R16, the lead 46a being connected by way of a resistance R18 to a transistor Q3 which is itself connected by way of a diode D6 to the output of a comparator LA6. The transistor Q3 is also connected through a diode D7 to the transistor Q4. The comparator LA6 is connected to the integrator LA5, the transistor Q4, and to a transistor Q5. The transistor Q5 is connected, by way of a resistance R34 and a diode D18, to the output of the comparator LA6.

The circuit described in the preceding paragraph is a voltage to frequency converter circuit, such that, if the voltages at the points 33, 46 are $V_r$ and $V_f$ respectively, the output frequency F from the comparator LA6 is $$F = V_f/V_r + K,$$

and is thus functionally related to the ratio of the voltages $V_r$, $V_f$. K is a variable which is adjustable by means not shown.

The said voltage to frequency converter circuit operates as follows. The reference voltage of the comparator LA6 is set by the transistor Q4 at a value equal to $V_r/2$ when the output from the comparator LA6 is low, and is set by the transistor Q5 at a value equal to $V_r$ when the output from the comparator LA6 is high.

Assuming that the output from the comparator LA6 is high then the transistor Q3 is on and the output voltage of the integrator LA5 increases until it reaches the value $V_r$. The output of the comparator LA6 then decreases, turning the transistor Q3 off and causing the output voltage of the integrator LA5 to decrease. When the output voltage of the integrator LA5 reaches the value Vr/2, the comparator LA6 switches over, thus reversing the direction of the integration, and the cycle repeats.

The integration rate is set by the ratio of the values of the resistance R16 and R18 so as to be equal in both parts of the cycle. The output from the comparator LA6 is fed to a linearisation circuit 55 and thence via an amplifier 56 to an output display 57. Thus any variation in the flow rate in the conduit 10 will produce a linear change at the output display 57.

The circuit shown in FIG. 8 is designed to take account of the fact that the thermistors 13, 14 have only one stable operating point, and are automatically taken to this point during the initial warm-up time when the circuit is switched on.

The output from the amplifier 56 instead of, or in addition to, being displayed at the output display 57 may be taken to a flow control valve 63 which controls, by means not shown, the amount of steam or other fluid to be mixed with gas flowing through the conduit 10. Thus the conduit 10 may be a conduit through which waste gas flows to a flare stack (not shown), the amount of steam injected being controlled by the flow control valve 63, and being proportional to both the mass flow and molecular weight of the waste gas.

In the construction shown in FIG. 9, the conduit 10, thermistors 13, 14, and orifice plate 11 of the FIG. 1 construction are embodied in a probe 64 which is adapted to be inserted as shown in a gas duct 65.

In the construction shown in FIG. 10 the thermistors 13, 14 and the orifice plate 11 of the FIG. 1 construction are provided in a by-pass conduit 66 which is formed in a probe 67, the by-pass conduit 66 having an upstream portion 68 which receives gases flowing through a gas duct 70, and a downstream portion 71 which returns the by-pass flow to the duct 70.

The advantage of the construction shown in FIG. 10 is that the probe 67 can be provided with means (not shown) for removing dirt and moisture, for reducing heat, and for purging the by-pass conduit 66 of dirt, without the need to provide the gas duct 70 itself with any such equipment. In other words, only a very small proportion of the gases flowing through the gas duct 70 needs to be treated, e.g. by having dirt removed therefrom.

In FIG. 11 there is shown a construction for use in measuring low flows which is generally similar to that of FIG. 10. In FIG. 11, however, a probe 72 is employed having a plurality (e.g. four as shown) of inlet ports 73 each of which communicates with the upstream portion 68 of the by-pass conduit 66. The inlet ports 73 are spaced from each other in accordance with known approximation functions (e.g. those of Pade, Chebyschef, or Butterworth) such that the gas passing the thermistors 13, 14 in the by-pass conduit 66 has a composition corresponding to the average composition of the gas flowing through the whole gas duct 70.

The probe 72 has a plurality (e.g. two as shown) of outlet ports 74 each of which communicates with the downstream portion 71 of the by-pass conduit 66, the use of such a plurality of outlet ports 74 preventing blocking in the event of reverse flow. The probe 72 is provided internally with welded blocks 75 (only one shown) so shaped as to force the gas which flows through the gas duct 70 in the direction of arrows 76 to enter the inlet ports 73 and to flow through the by-pass conduit 66 and so out through the outlet ports 74.

If the probe 72 is to be used to examine flows both in the direction of the arrows 76 and in the opposite direction, the probe 72 is provided with equal numbers of inlet ports 73 and outlet ports 74, and the inlet and outlet ports are aligned with each other.

The probe 72 may be used for the examination of gas flowing through a duct of any shape, e.g. a cylindrical duct or one having a rectangular cross-section. The probe 72 is particularly suited, however, for examination of the gas flowing through a flue stack 80, as shown in FIG. 12. In that case, the portion of the by-pass conduit 66 which is disposed externally of the flue stack 80 may be provided as shown with a moisture trap 81 having a continuously self-draining "S" tube 82.

We claim:

1. Apparatus for determining fluid flow, said apparatus comprising flow obstruction means and two heat-emitting members which are mounted in a geometrically symmetrical arrangement in a conduit, the heat-emitting members being subject to the same heat losses when there is no fluid flow through the conduit, the flow obstruction means causing the two heat-emitting members to be differentially affected by the fluid flow through the conduit, means for heating each of the two heat-emitting members to a temperature higher than that of the fluid, and means responsive to the ratio of the heat losses from the two heat-emitting members for determining the said fluid flow.

2. Apparatus as claimed in claim 1 in which the conduit is a by-pass conduit which is arranged to receive part of the flow passing through a duct.

3. Apparatus as claimed in claim 1 in which the conduit is provided in a probe which is adapted to be inserted into a duct.

4. Apparatus as claimed in claim 1 in which the flow obstruction means comprises a flow obstruction member on opposite sides of which the heat-emitting members are disposed.

5. Apparatus as claimed in claim 4 in which the heat-emitting members are disposed on opposite sides of and are aligned with an orifice in a flow obstruction member which extends completely across the conduit.

6. Apparatus as claimed in claim 4 in which the heat-emitting members are disposed on opposite sides of a flow obstruction member which extends partially across the conduit.

7. Apparatus as claimed in claim 1 in which the heat-emitting members are located at opposite ends of a venturi-shaped flow obstruction means.

8. Apparatus as claimed in claim 1 in which the flow obstruction means comprises two flow obstruction members which are spaced apart along the axis of the conduit, the heat-emitting members being disposed between the two flow obstruction members.

9. Apparatus as claimed in claim 1 in which the heat-emitting members are thermistors.

10. Apparatus as claimed in claim 1 in which the means responsive to the said ratio is responsive to the ratio of voltages whose values respectively depend upon the respective heat losses from the two heat-emitting members.

11. Apparatus as claimed in claim 10 in which the means responsive to the said ratio includes means for producing an output frequency which is functionally related to the ratio of the said voltages.

12. A method of determining the fluid flow through a conduit, said method comprising mounting flow obstruction means and two heat-emitting members in a geometrically symmetrical arrangement in the conduit, the heat-emitting members being subject to the same heat losses when there is no fluid flow through the conduit, producing a fluid flow through the conduit which causes the two heat-emitting members to be differentially affected by the said fluid flow, heating each of the two heat-emitting members to a temperature higher than that of the fluid, and employing the ratio of the heat-losses from the two heat-emitting members to determine the said fluid flow.

13. A method as claimed in claim 12 in which the said ratio is employed to determine the direction of flow of the fluid through the conduit.

14. Apparatus for determining fluid flow, said apparatus comprising a venturi-shaped flow obstruction means and two heat-emitting members which are mounted in a geometrically symmetrical arrangement in a conduit, the heat-emitting members being mounted on opposite sides of the throat of the venturi and being subject to the same heat losses when there is no fluid flow through the conduit, the flow obstruction means causing the two heat-emitting members to be differentially affected by the fluid flow through the conduit, and means responsive to the ratio of the heat losses from the two heat-emitting members for determining the said fluid flow.

* * * * *

UNITED STATES PATENT OFFICE
CERTIFICATE OF CORRECTION

PATENT NO. : 4,083,244
DATED : April 11, 1978
INVENTOR(S) : JORAM AGAR and KLAUS JOACHIM ZANKER It is certified that error appears in the above-identified patent and that said Letters Patent are hereby corrected as shown below:

Column 1, line 55, "However" should read --Moreover--

Column 2, line 16, "differently" should read --differentially--

Column 2, line 64, "anomometer" should read --anemometer--

Column 4, line 61, "cae" should read --case--

Column 6, line 7, "amplitude" should read --amplifier--

Column 6, line 66, "Vr/2" should read $--\frac{V_r}{2}--$

Column 7, line 8, "Vr/2" should read $--\frac{V_r}{2}--$

Signed and Sealed this

Twenty-first Day of November 1978

[SEAL]

Attest:

RUTH C. MASON
Attesting Officer

DONALD W. BANNER
Commissioner of Patents and Trademarks